(12) United States Patent
Fripp

(10) Patent No.: US 8,091,637 B2
(45) Date of Patent: *Jan. 10, 2012

(54) PROPPANT FOR USE IN A SUBTERRANEAN FORMATION

(75) Inventor: Michael L. Fripp, Carrollton, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 23 days.

This patent is subject to a terminal disclaimer.

(21) Appl. No.: 12/878,467

(22) Filed: Sep. 9, 2010

(65) Prior Publication Data

US 2011/0056687 A1    Mar. 10, 2011

Related U.S. Application Data

(62) Division of application No. 11/297,513, filed on Dec. 8, 2005, now Pat. No. 7,836,952.

(51) Int. Cl.
*E21B 43/04* (2006.01)

(52) U.S. Cl. .................. 166/278; 166/305.1; 166/280.1

(58) Field of Classification Search .................. None
See application file for complete search history.

(56) References Cited

U.S. PATENT DOCUMENTS

| 5,501,275 | A  | * | 3/1996  | Card et al. | 166/280.2 |
| 7,836,952 | B2 | * | 11/2010 | Fripp       | 166/280.1 |

* cited by examiner

*Primary Examiner* — Angela M DiTrani
(74) *Attorney, Agent, or Firm* — Robert A. Kent; Booth Albanesi Schroeder LLC

(57) ABSTRACT

A method for filling an annular area within a wellbore penetrated by a subterranean formation is provided. The method includes the steps of: (a) introducing a proppant into a wellbore to form a gravel pack of the proppant, wherein a specimen of the proppant has a non-globular and non-fibrous shape, and wherein the shape is further selected to provide the proppant the ability to bridge together such that the proppant has a maximum bridging span of at least 3 times larger than a largest overall dimension of the proppant specimen, where the maximum bridging span is the largest outlet hole diameter that the proppant can bridge under the weight of gravity; and (b) passing fluid through the gravel pack.

14 Claims, 14 Drawing Sheets

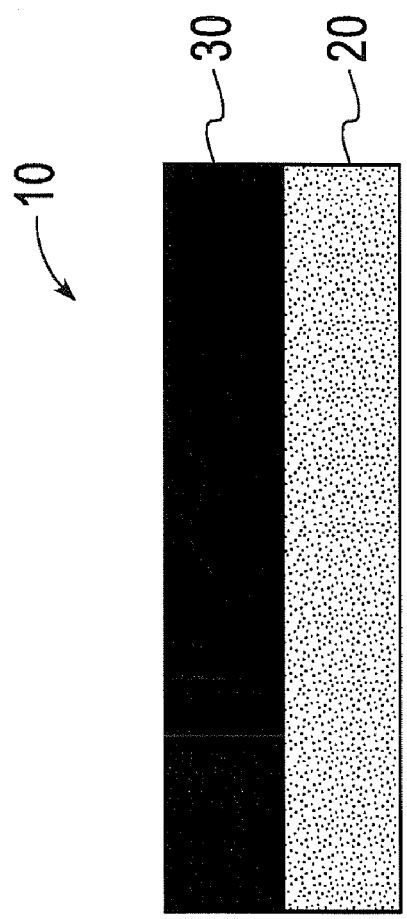
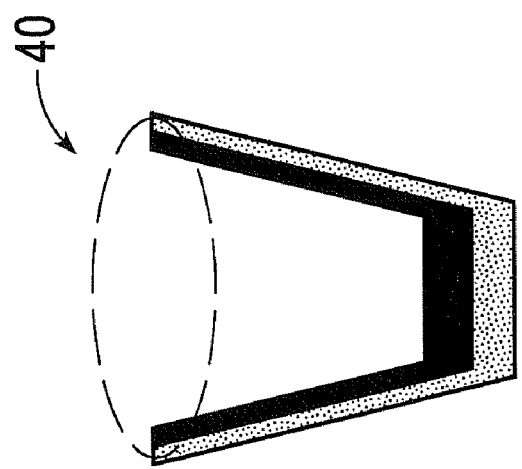
FIGURE 2B
FIGURE 2A

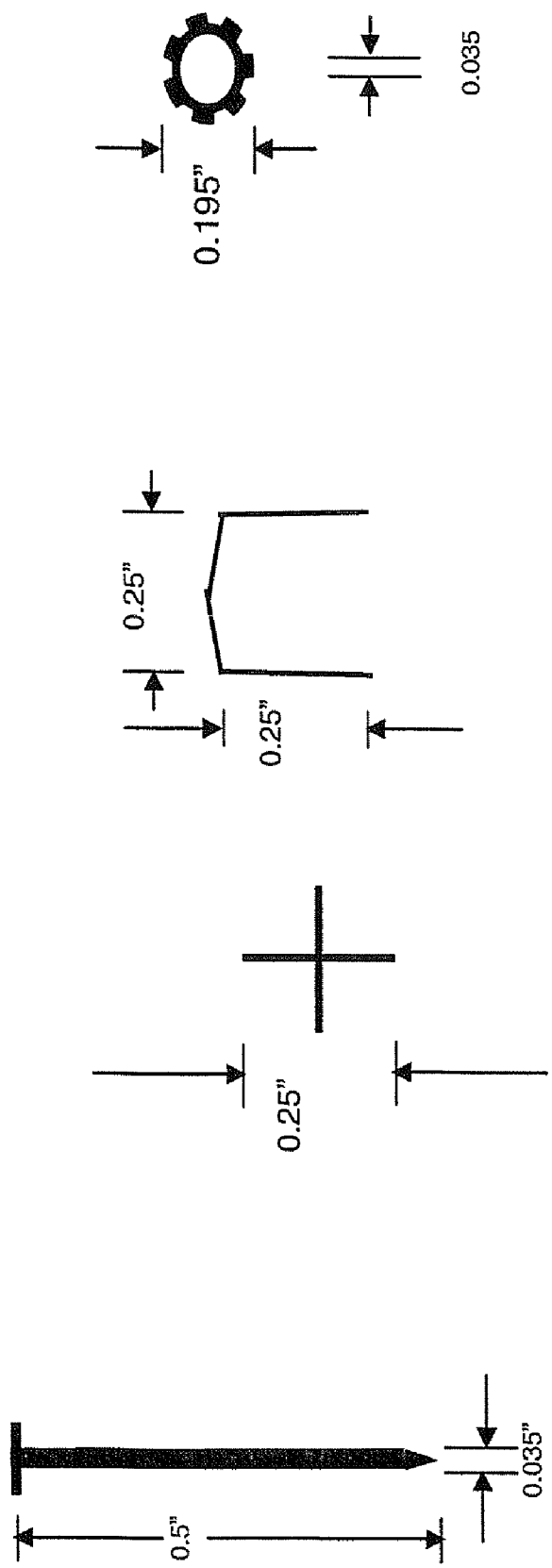

n=3 n=1

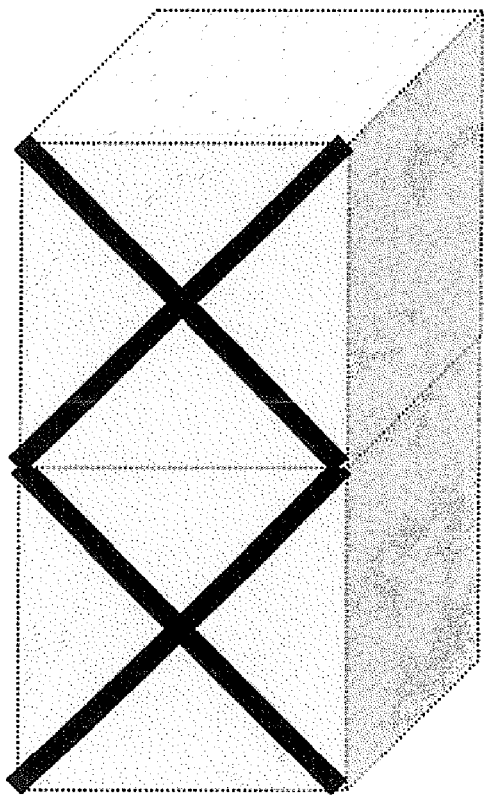
n1
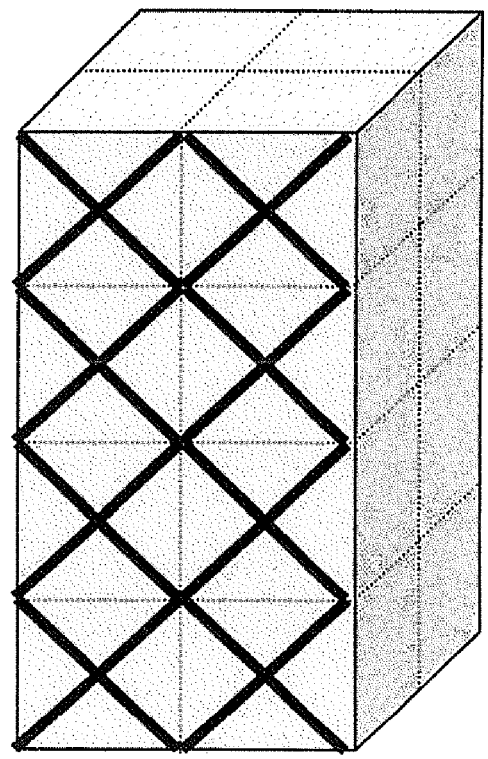
n2
FIGURE 14A
FIGURE 14B

PROPPANT FOR USE IN A SUBTERRANEAN FORMATION

CROSS-REFERENCE TO RELATED APPLICATIONS

This application is a divisional of U.S. patent application Ser. No. 11/297,513 filed on Dec. 8, 2005 now U.S. Pat. No. 7,836,952.

STATEMENT REGARDING FEDERALLY SPONSORED RESEARCH OR DEVELOPMENT

Not Applicable

REFERENCE TO MICROFICHE APPENDIX

Not Applicable

FIELD OF THE INVENTION

The invention generally relates to proppant for use in subterranean formations. More specifically, the invention relates to compositions and methods for treating a subterranean formation using improved proppant that is capable of bridging together and resisting flow back of particles and proppant.

BACKGROUND OF THE INVENTION

One set of techniques to maximize hydrocarbon production is referred to as "stimulation." Stimulation procedures are usually performed on production wells completed in oil and/or gas containing formations; however, injection wells used in secondary or tertiary recovery operations can also be fractured to facilitate the injection of the fluids.

One stimulation technique is hydraulic fracturing. Hydraulic fracturing involves injecting a fracturing fluid into the wellbore directed at the face of a hydrocarbon-bearing geologic formation at pressures sufficient to initiate and extend cracks (fractures) in the formation. The continued pumping of the fracturing fluid extends the fractures. A proppant, such as sand or other particulate material, can be suspended in the fracturing fluid and introduced into the created fractures. The proppant material holds or "props" open the fracture and prevents the formed fractures from closing upon reduction of the hydraulic pressure. In this way, conductive channels remain through which produced fluids can readily flow to the wellbore upon completion of the fracturing treatment.

A typical proppant used in hydraulic fracturing is 20/40 mesh sand or bauxite. The shape of the sand is generally rounded or globular, often having jagged or rough surface features, although it can also approach a relatively smooth spheroid shape.

Such globular proppants sometimes flow back into the wellbore during production because the globular shapes slide by each other with relative ease. Proppant flow back is more pronounced when relatively large diameter perforations are used due to the inability of the globular shaped proppants to bridge openings that are substantially larger than the size of the proppant. When proppant material is flowed back from a well, the proppant becomes an undesirable contaminant because the proppant acts to reduce the production of oil from the well by clogging the wellbore. These proppants also must be separated from the oil to render the oil commercially useful, adding more expense and effort to oil processing.

One approach used to combat the problem of proppant flow back has been to mix fibrous materials in intimate contact with the proppant particles. The fibers are placed in the wellbore and believed to form a net across constructions and orifices in the proppant pack, thereby attempting to stabilize the proppant pack. The fibers form a net by merely tangling or wrapping around or crossing each other. The fibers are only able to hold minimal tensile load, however. Thus, any load other than a minimal tensile load will result in detangling and buckling of the fibers, which provides for inefficient control of flow back.

Other particulate materials besides proppants can also flow back from the well, such as particulates and fines from the formation. Undesirable flow back of particulate materials during production of oil or other fluids from a subterranean formation can pose a serious problem. This problem is particularly pronounced in unconsolidated formations, which are those that are less structured, and therefore, more easily facilitate the uninhibited flow of particulate materials. Such particulate materials that become contaminants when flow up the wellbore significantly wear down well production equipment, including the pumps and seals used in the recovery and pumping process.

Thus, there has been a long-felt need in the field for a proppant and method that can reduce or eliminate proppant and particle flow back.

SUMMARY OF THE INVENTION

The invention provides a proppant for treating a subterranean formation penetrated by a wellbore, wherein a typical specimen of the proppant has a non-globular and non-fibrous shape.

The invention also provides a method for stimulating a subterranean formation penetrated by a wellbore, the method comprising the steps of forming a treatment fluid and introducing the treatment fluid through the wellbore and into the subterranean formation at a sufficient pressure to fracture the formation. The treatment fluid comprises a proppant, wherein a typical specimen of the proppant has a non-globular and non-fibrous shape; and a carrier fluid to carry the proppant through the wellbore and into the subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that the specific embodiments are not intended to limit the invention to the particular forms disclosed, but, on the contrary, the invention is to cover all modifications and alternatives falling within the scope and spirit of the invention as expressed in the appended claims.

BRIEF DESCRIPTION OF THE DRAWINGS

FIG. 2A illustrates a cross-sectional view of a multilayered, badminton-shaped proppant;

FIG. 2B illustrates a cross-sectional view of multiple-layered sheet that can be used to make the proppant;

FIGS. 6A-6D illustrate in cross-sectional views selected proppant shapes that exhibited unexpectedly good test results: the nail shape, the plus shape, the staple shape, and the lock washer shape, respectively;

FIGS. 14A-14B illustrate the scaling behavior for bending deflections, where the scaling behavior for n=1 is illustrated in FIG. 14A and where the scaling behavior for n=2 is illustrated in FIG. 14B.

DETAILED DESCRIPTION OF THE PREFERRED EMBODIMENTS

In hydraulic fracturing applications, it is especially advantageous for the proppant to have a shape that facilitates the ability of the proppant to flow into a formation, bridge together, and resist flow back. The shape of the proppant is an important factor in determining the proppant's bridging ability. The proppant according to the present invention can encompass shapes that include lobed shapes, figure eight shapes, star shapes, rectangular cross-sectional shapes, six point jack shapes, torroid shapes, and the like.

Figure 1D:
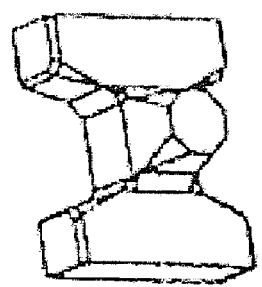
FIGS. 1A through 1I illustrate perspective views of various shapes that the proppant can encompass.
Figure 1G:
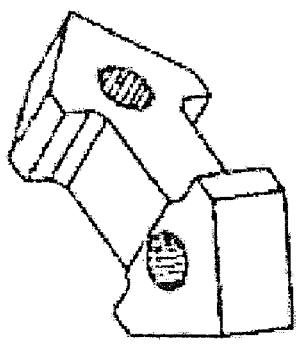
Figure 1I:
Figure 1C:
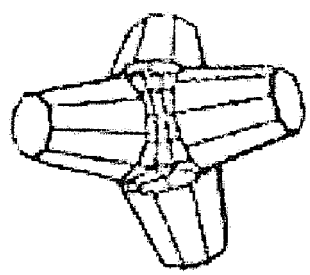
Figure 1F:
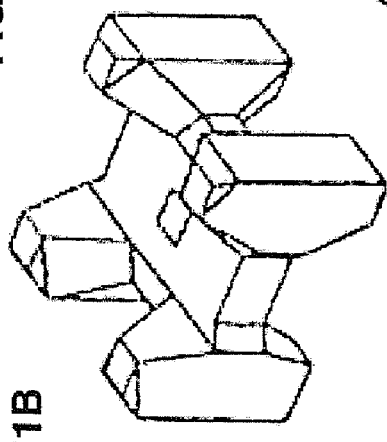
Figure 1B:
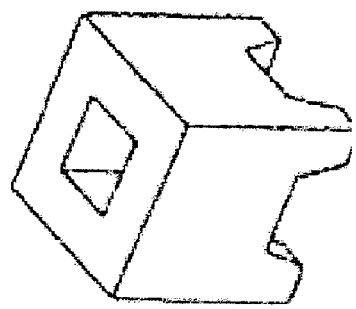
Figure 1H:
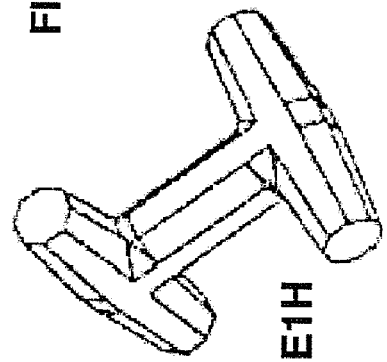
Figure 1A:
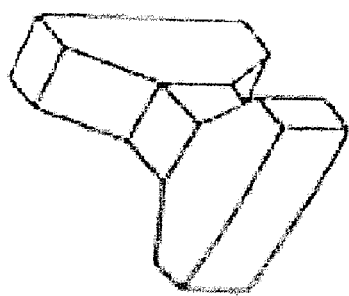
Figure 1E:
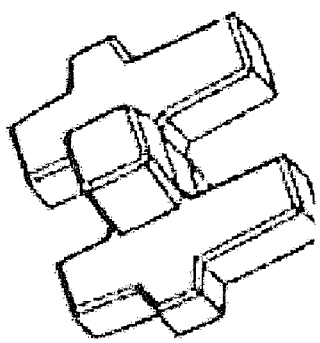

FIGS. 1A-1I illustrate perspective views of example proppant shapes that are encompassed by the present invention. The shapes are bridging shapes that are used by civil engineers to provide breakwaters in harbors. The shapes are formally called, respectively, akmon (FIG. 1A), cube (modified) (FIG. 1B), tetrapod (FIG. 1C), accropod (FIG. 1D), gasho block (FIG. 1E), n-shaped block (FIG. 1F), toskane (FIG. 1G), dolos (FIG. 1H), and tribar (FIG. 1I). Other three dimensional proppant shapes are possible, including spiral-shaped, hooked on one or both ends, or other kind of clasping configurations. The proppant according to the invention can also be made to have a substantially varying diameter in order to facilitate bridging between the proppant particles. Some of the useful shapes can be classified as being substantially axi-symmetric, substantially radially symmetric, substantially spherically symmetric, and substantially jointed. For example, a nail and badminton-shaped proppant is axi-symmetric in shape. A lock washer and the plus shape are radial in shape. A jack is spherically symmetric in shape. The staple is jointed in shape. It should be understood by those skilled in the art that these shapes are mere examples of the some bridging shapes useful for the invention, and that other shapes that enable a proppant to bridge together can also be useful for the invention.

One advantageous shape for hydraulic fracturing proppant is the badminton shape 40, illustrated in FIG. 2A. Without being limited by any particular theoretical explanation, it is believed that the badminton-shaped proppant advantageously travels in the carrier fluid nose-forward toward the fracture, and when the fluid flow is stopped and then reversed, the proppant bridges together to resist flow back of proppant or sand from the formation into the wellbore.

The proppant according to the invention is preferably a manufactured proppant. For example, it is expected that the proppant can be made by stamping a sheet material into a desired proppant shape. Also, as illustrated in FIG. 2B, the proppant can be constructed such as to be multi-layered with materials having different density or coefficient of thermal expansion. For example, the proppant 40 can comprise an outer layer 20 and an inner layer 30. The outer layer 20 can be made of an anti-friction material and the inner layer 30 can be of a stronger material to support a fracture. Accordingly, the proppant shape can vary from one proppant to the next and multiple shapes of proppants can be combined simultaneously.

In addition, the proppant can be structured to envelop a chemical, such as a gel breaker that can be released from the proppant after a protective layer dissolves or after a compressive load on the proppant breaks open the protective layer. The proppant can also include a coating to help reduce water production from the formation.

In one aspect of the invention, the proppant has an electro-mechanical intermediate layer. For example, the proppant can encompass an electronic circuit that generates a resonant frequency of an inductive coil circuit in response to temperature, pressure, or compressive load conditions. It is also possible to magnetize the proppant to increase the bridging properties in a fracture, allow the proppants to stick to the sand filter in gravel packing, and/or cause the proppant to magnetically attach to the steel casing in cementing applications.

Figure 3A:
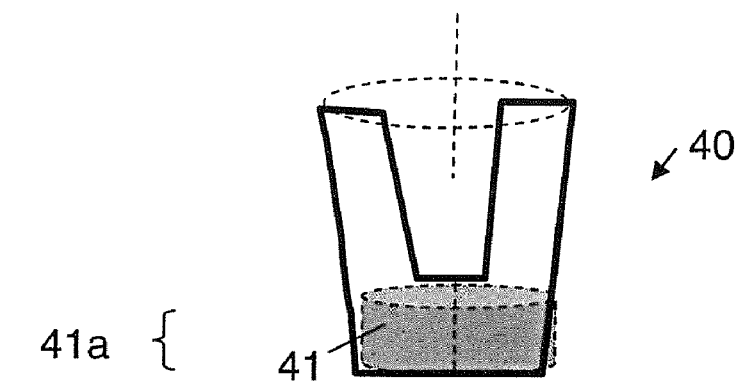
FIGS. 3A-3C illustrate in a cross-sectional view a method of measuring the aspect ratios of the badminton-shaped proppant.
Figure 3B:
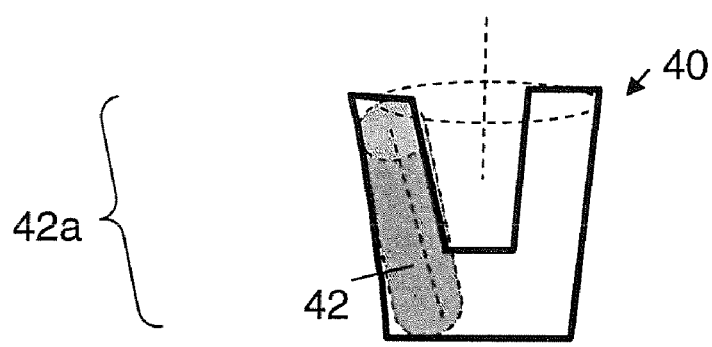
Figure 3C:
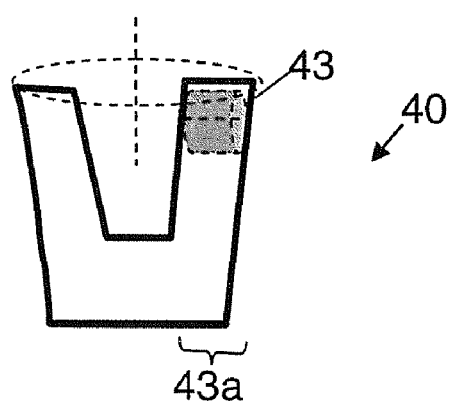

FIG. 3A, FIG. 3B, and FIG. 3C illustrate a method of measuring the aspect ratios of a proppant, specifically in this case, a badminton-shaped proppant 40. According to this measuring technique, a typical unit specimen of the proppant has a shape at least partially defined by a first largest imaginary cylinder 41 that can be imaginarily positioned in any portion of the solid body of the proppant, and that is at least as large in volume as any other imaginary cylinder that can be imaginarily positioned in any other portion of the solid body of the proppant.

Further, the typical unit specimen of the proppant can have a shape at least partially defined by a second largest imaginary cylinder 42 that can be imaginarily positioned in any portion of the solid body of the proppant, that is less than or equal in volume to the first largest imaginary cylinder, and that has an axis substantially non-aligned and substantially non-symmetrical relative to the first largest imaginary cylinder, although they can be parallel.

As used herein, the term "non-aligned" means that the axis of the imaginary cylinders do not align or overlap. Further, as used herein, the term "non-symmetrical" means that there is not a symmetrical relationship between the imaginary cylinders. More particularly, what is meant is that the typical unit specimen of the proppant cannot be rotated about or reflected across any imaginary line of symmetry to position the same size and shape of one imaginary cylinder into the same size and shape of the next contemplated imaginary cylinder. Thus, in the badminton-shaped proppant illustrated in FIGS. 3A-3C, the first largest imaginary cylinder can be rotated or reflected about the central axis of the badminton-shaped proppant. Thus, a second largest imaginary cylinder cannot include one which can be merely rotated into overlapping position and shape with the first imaginary cylinder.

Furthermore, as used herein, "substantially non-aligned" or "substantially non-symmetrical" is intended to take into account variations in the shape of the particles.

In addition, the typical unit specimen of the proppant has a shape at least partially defined by a third largest imaginary cylinder 43 that can be imaginarily positioned in any portion of the solid body of the proppant, that is less than or equal in volume to the second largest imaginary cylinder, that has an axis substantially non-aligned and substantially non-symmetrical relative to the first largest imaginary cylinder, and that has an axis substantially non-aligned and substantially non-symmetrical to the second largest imaginary cylinder. It should be understood by those skilled in the art, of course, that the proppant can have many more imaginary cylinders, depending on the particle shape.

Finally, the typical unit specimen of the proppant has a shape at least partially defined by the aspect ratio of the length of the first largest imaginary cylinder, 41a shown in FIG. 3A, and the length of the second largest imaginary cylinder, 42a shown in FIG. 3B, based on whichever is the longer, is less than 50:1. In other words, the length of one of the first and second imaginary cylinders is not more than 50 times longer than the other. Also, the aspect ratio of the length of the second largest imaginary cylinder, 42a, and the length of the third largest imaginary cylinder, 43a shown in FIG. 3C, based on whichever is the longer, is less than 50:1. In other words, the length of one of the second and third imaginary cylinders is not more than 50 times longer than the other. As will hereinafter be discussed in detail, the aspect ratio influences the proppant's ability to self-bridge. On the other hand, if the aspect ratio is too high, the proppant is not expected to have good compression strength.

In a preferred embodiment, the typical unit specimen of the proppant has a shape at least partially defined by the aspect ratio of the length of the first largest imaginary cylinder, 41a, and the length of the second largest imaginary cylinder, 42a, based on whichever is the longer, is less than 5:1. Also, the aspect ratio of the length of the second largest imaginary cylinder, 42a, and the length of the third largest imaginary cylinder, 43a, based on whichever is the longer, is less than 5:1.

Figure 4A:
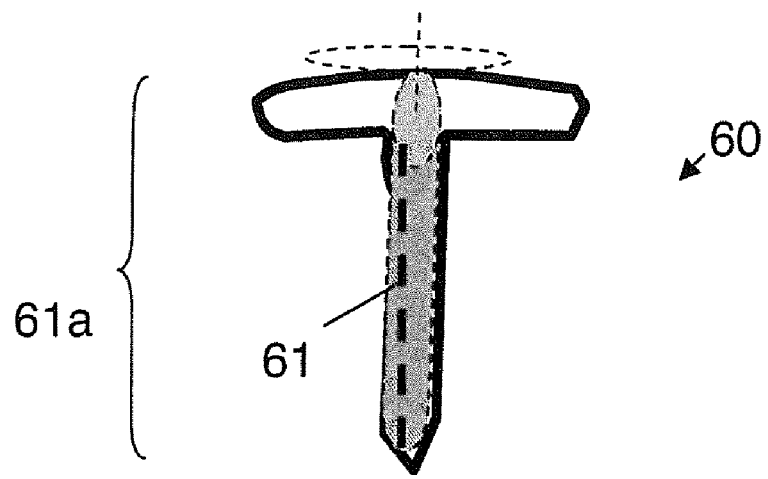
FIGS. 4A-4C illustrate in a cross-sectional view a method of measuring the aspect ratios of the nail-shaped proppant.
Figure 4B:
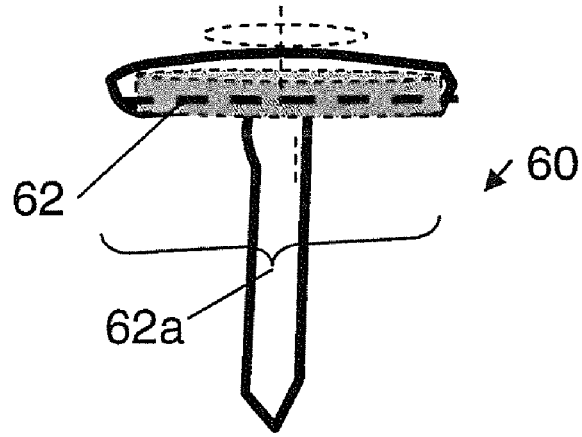
Figure 4C:
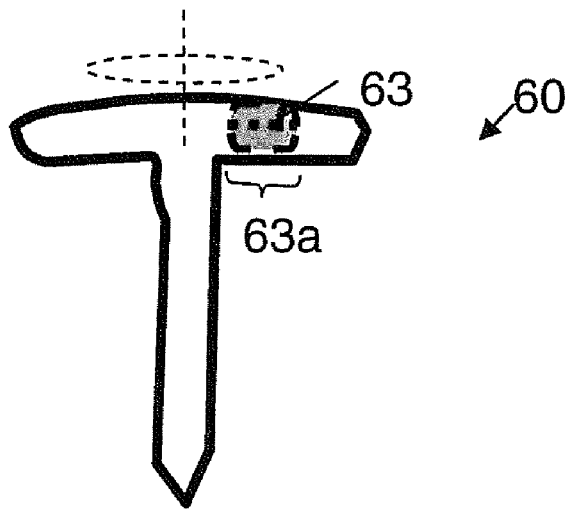

FIG. 4A, FIG. 4B, and FIG. 4C illustrate a method of measuring the aspect ratios as applied to a proppant shaped as a nail 60. A first largest imaginary cylinder 61 shown in FIG. 4A that can be imaginarily positioned in any portion of the solid body of the nail-shaped proppant, and that is at least as large in volume as any other imaginary cylinder that can be imaginarily positioned in any other portion of the solid body of the nail-shaped proppant.

Further, the typical unit specimen of the proppant has a shape at least partially defined by a second largest imaginary cylinder 62 shown in FIG. 4B that can be imaginarily positioned in any portion of the solid body of the proppant, that is less than or equal in volume to the first largest imaginary cylinder, and that has an axis substantially non-aligned and substantially non-symmetrical relative to the first largest imaginary cylinder.

In addition, the typical unit specimen of the proppant has a shape at least partially defined by a third largest imaginary cylinder 63 shown in FIG. 4C that can be imaginarily positioned in any portion of the solid body of the proppant, that is less than or equal in volume to the second largest imaginary cylinder, that has an axis substantially non-aligned and substantially non-symmetrical relative to the first largest imaginary cylinder, and that has an axis substantially non-aligned and substantially non-symmetrical to the second largest imaginary cylinder.

The typical unit specimen of the nail-shaped proppant has a shape at least partially defined by the aspect ratio of the length of the first largest imaginary cylinder, 61a shown in FIG. 4A, and the length of the second largest imaginary cylinder, 62a shown in FIG. 4B, based on whichever is the longer, is less than 50:1. In other words, the length of one of the first and second imaginary cylinders is not more than 50 times longer than the other. Also, the aspect ratio of the length of the second largest imaginary cylinder, 62a, and the length of the third largest imaginary cylinder, 63a shown in FIG. 4C, based on whichever is the longer, is less than 50:1. In other words, the length of one of the second and third imaginary cylinders is not more than 50 times longer than the other. As will hereinafter be discussed in detail, the aspect ratio influences the proppant's ability to self-bridge. On the other hand, if the aspect ratio is too high, the proppant is not expected to have good compression strength.

In a preferred embodiment, the typical unit specimen of the nail-shaped proppant has a shape at least partially defined by the aspect ratio of the length of the first largest imaginary cylinder, 61a, and the length of the second largest imaginary cylinder, 62a, based on whichever is the longer, is less than 5:1. Also, the aspect ratio of the length of the second largest imaginary cylinder, 62a, and the length of the third largest imaginary cylinder, 63a, based on whichever is the longer, is less than 5:1.

In preferred embodiments, the overall length of the single proppant ranges upwardly from about 1/32 inch to about 1/2 inch. The overall width of the proppant ranges from about 1/128 inch to about 1/8 inch. The typical specimen of the proppant has an overall dimension of less than 1/4 inch. It should be understood, of course, that depending on the process of manufacturing, variations in the single proppant's shapes, lengths, and diameters are normally expected from one single proppant to the next. Also, a variety of different shaped proppants can be used in a fracturing job. By mixing different proppant sizes and shapes, for example, a larger span can be bridged with the larger sized proppant, while also restricting sand production with smaller proppant shapes and sizes.

Figure 5B:
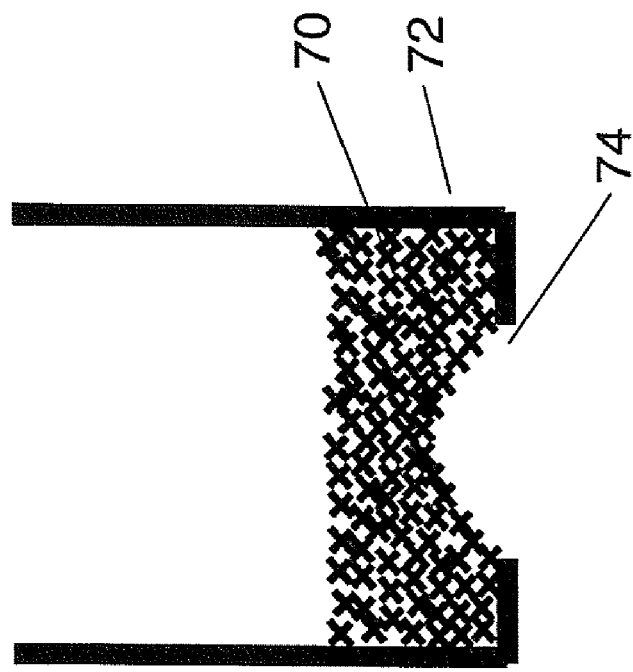
FIGS. 5A-5B illustrate in cross-sectional views two types of bridging by the proppant: tension bridging and compression bridging, respectively.
Figure 5A:
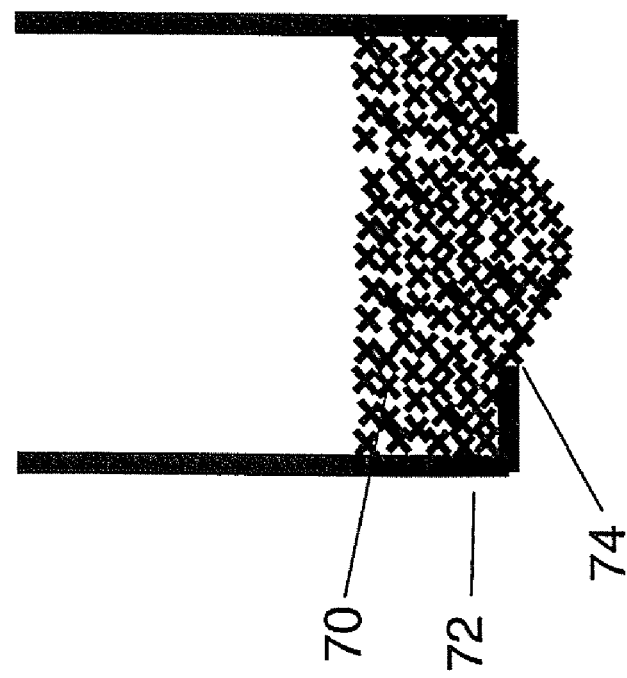

FIGS. 5A and 5B illustrate in cross-section two types of bridging by a proppant 70 across an opening, as represented by a circular opening 74 in the bottom of a cup 72. FIG. 5A illustrates tension bridging and FIG. 5B illustrates compression bridging. Without being limited by any particular theoretical explanation, it is believed that the shape of the proppant influences the mechanism by which bridging occurs. For example, proppant having angular shapes, such as a staple shape, can form tension bridges by hooking together, while proppant having spokes emanating from a central hub such as lock washer or plus-shaped proppant can form compression bridges by having the spokes of different particles interfere with one another. Of course, some proppant shapes that are useful in the invention have a combination of tension and compression bridging. The tensile load and compressive load of the proppants works to prevent unhooking and buckling of the proppant when pressure of fluid flow is exerted, one way or the other. In this way, the proppant withstands fracture pressures as well as prevents particulate flow back in hydraulic fracturing applications.

Without being limited by theory, it is believed that a proppant that forms tension bridges tend to hook together. The clumping caused by a tension-bridging proppant can become problematic when inserted into the fracture because it is more likely to prematurely bridge prior to reaching the desired destination in the fracture.

For this reason, as will hereinafter be discussed in detail, it is believed that shapes having major spokes, such as plus and lock washer-shaped proppants are advantageous for well treatment fluids in hydraulic fracturing applications because a compression-bridging proppant is less likely to prematurely bridge and, thus, easily flow into a fracture.

Conventional sand proppants are typically made of ceramic or glassy materials that have high compressive strength, but limited fracture toughness. As a result, these sand materials tend to fracture under extreme loads.

According to the invention, various materials can be used to manufacture the proppant including but not limited to metals such as iron, ferrite, steel, and alloys of such metals. Metallic proppants, in addition to having relatively high compressive strength, can support a heavier load in compression due to their fracture toughness. Depending on the application, and more particularly on the closure stress expected to be encountered in the fracture, "soft" alloys can be used. Depending on the intended well-treatment application, the proppant can also comprise materials such as glass, natural or synthetic fibers, ceramic, and plastic, provided that it has the desired shape properties according to the invention. Other materials useful for the invention is fiber reinforced epoxies such as graphite epoxy, fiberglass, and carbon fiber epoxy composite. PEEK plastic is especially advantageous because it is easily formed into shape. The proppant of the invention is preferably made of metallic material.

The proppant according to the invention is substantially rigid. The proppant's rigidity is particularly advantageous in hydraulic fracturing, able to sustain a fracture in the open position. As spheroid proppant experiences a large compressive load in a fracture, it tends to slump and create a narrower fracture. The amount of slumping correlates to the angle of repose of the material. In contrast, the proppant shapes according to the invention have a high angle of repose, which is especially advantageous because it is held in place through load-sharing. Thus, the proppant of the invention allows for better hydrocarbon permeability through the proppant without compromising proppant strength.

The proppant advantageously provides for higher hydrocarbon permeability through the proppant, at least a permeability of at least 100 Darcy can be established with a porosity of at least 40%. Preferably, the permeability is at least 4000 Darcy.

The carrier fluid of the treatment fluid is usually designed according to three main criteria: the ability to efficiently transport the necessary material (such as pack sand during a gravel pack), the ability to separate or release the materials at the correct time or place, and compatibility with other wellbore fluids while being non-damaging to exposed formations. The carrier fluid for use in the treatment fluid is aqueous-based or oil-based. The carrier fluid for use in the treatment fluid can be selected from the group consisting of gelled oil, gelled aqueous fluid, aqueous polymer solutions, aqueous surfactant solutions, viscous emulsions of water and oil, gas, and any mixtures in any proportion thereof. The water for use in an aqueous-based treatment fluid can be of any convenient or desired source, such as fresh water, seawater, natural brine, formulated brine, 2% KCl solution, and other water that does not undesirably interact with the composition of the invention. Formulated brine is manufactured by dissolving one or more soluble salts in water, natural brine, and/or seawater. Representative soluble salts are the chloride, bromide, acetate and formate salts of potassium, sodium, calcium, magnesium, and zinc.

The invention also provides methods for stimulating a subterranean formation penetrated by a wellbore. In one aspect of the invention, the method comprises the steps of: a) forming a treatment fluid according to the invention; and b) introducing the treatment fluid into the wellbore under a pressure sufficient to fracture the formation.

The invention is especially advantageous in hydraulic fracturing applications. The proppant according to the invention allows for: 1) relatively increased propped fracture width; 2) increased fracture toughness; and 3) reduced proppant and other particulate flow back. Thus, the proppant according to the invention acts as both a proppant and a material that withstands flow back of proppant and other particles.

The proppant itself acts not only to prop open fractures, but also prevent flow back of proppant and other particulates. It is contemplated that other materials can be employed in a treatment fluid according to the invention to further help prevent proppant and other particulates from flowing back from the formation or wellbore.

It should be understood by those skilled in the art that the proppant of the invention can be used during the whole fracturing treatment or only part of the treatment. For example, the method can comprise of two non-simultaneous steps of placing a first proppant of spheroid proppant and placing a second proppant of the invention. By spheroid proppant, it is meant any conventional proppant that is well known by those skilled in the art of fracturing, such as sand, silica, synthetic organic particles, glass microspheres, ceramics, or deformable proppants. Thus, if desired, the proppant of the invention can be added only at the tail end of a treatment.

To further illustrate the present invention, and not by way of limitation, the following test examples are provided.

The bridging property of proppant shapes can be understood by measuring the minimum diameter for pouring, the maximum bridging span, the flow back testing, porosity, and permeability. Three main tests were performed on proppant shapes: the minimum pouring diameter test; the maximum bridging span test, and the flow back test. These tests were conducted in plexiglass tubes with outlet hole diameters of ⅜", ½", ¾", 1", 1½", 2¼", and 3". The outlet hole diameters of ⅜", ½", ¾", 1" were cut into a plate that was glued to the base of a 1/1;2 " diameter tube. The outlet hole diameter of 1½" was cut and glued to the base of a 2" diameter tube. The 2¼" and 3" outlet hole diameters were cut into a plate glued to the base of a 4" diameter tube. The proppant behavior is categorized in relationship to the outlet hole diameter.

The bridging properties for various proppant shapes were evaluated according to these tests. FIGS. 6A-6D illustrated selected proppant shapes that exhibited good test results: the nail shape (FIG. 6A), the plus shape (FIG. 6B), the staple shape (FIG. 6C), and the lock washer shape (FIG. 6D). These shapes exhibited good results based on testing the proppant shape for the minimum diameter for pouring, the maximum bridging span, and the maximum flow rate during flow back tests.

Figure 7:
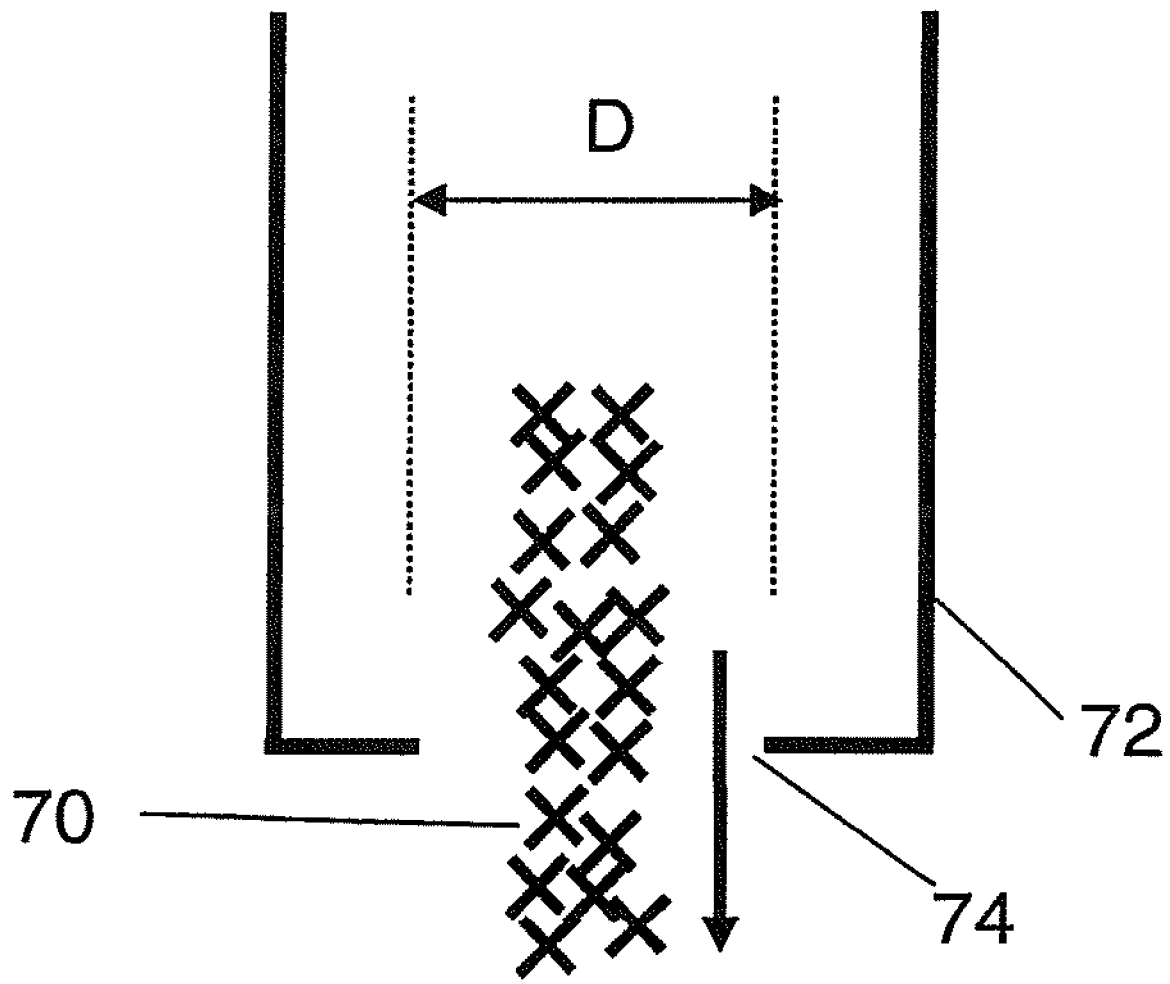
FIG. 7 is an illustration of the measurement of the minimum diameter for pouring a particular proppant without bridging across an opening.

FIG. 7 illustrates a method for testing the minimum diameter for pouring, which is defined as the smallest outlet hole diameter that the proppant of a given shape and size can collectively pour through steadily without bridging together. More particularly, a proppant 70 of a given shape and size is illustrated pouring freely across an opening, as represented by a circular opening 74 in the bottom of a cup 72. The diameter D of the circular opening 74 is adjusted to the smallest outlet hole diameter that will allow the proppant 70 to pour freely through the opening 74. In hydraulic fracturing applications, this test illustrates the ability of the proppant to flow through the perforation into the hydraulic fracture. It is advantageous to have a proppant that flows into the formation with a relatively low tendency to bridging. It is believed that a smaller minimum pouring diameter represents an easier flow into a smaller perforation in the formation.

The maximum bridging span is defined as the largest outlet hole diameter that the proppant can bridge under the weight of gravity, measured in inches. Thus, the maximum bridging span is the maximum hole size that the proppant can bridge across. The maximum bridging span is measured as follows: 1) the proppant is placed in a tube with a bottom hole blocked; 2) the proppant are mechanically compressed with roughly 10 psi to obtain a "link"; and 3) the bottom hole is unblocked. Without being limited by theory, it is believed that in hydraulic fracturing applications, the maximum bridging span determines the ability of the proppant to create a bridging span once the proppant has been inserted into the fracture. Thus, a larger bridging span is believed to be related to the proppant's ability to arch across a wider perforation. According to the invention, the proppant, in an aggregate, has a maximum bridging span of at least 3 times larger than a largest overall dimension of a typical specimen of the proppant.

The proppant shape is a design trade-off between the ability of the single proppant to enter a small perforation and the ability to bridge together across a wide gap. The proppant of the invention advantageously provides for the ability to flow into a small perforation (a small minimum pouring diameter) while also being able to bridge a wide perforation (a large maximum bridging span). These two metrics are believed to be useful for evaluating how the proppant shape affects performance in a subterranean formation.

Figure 8:
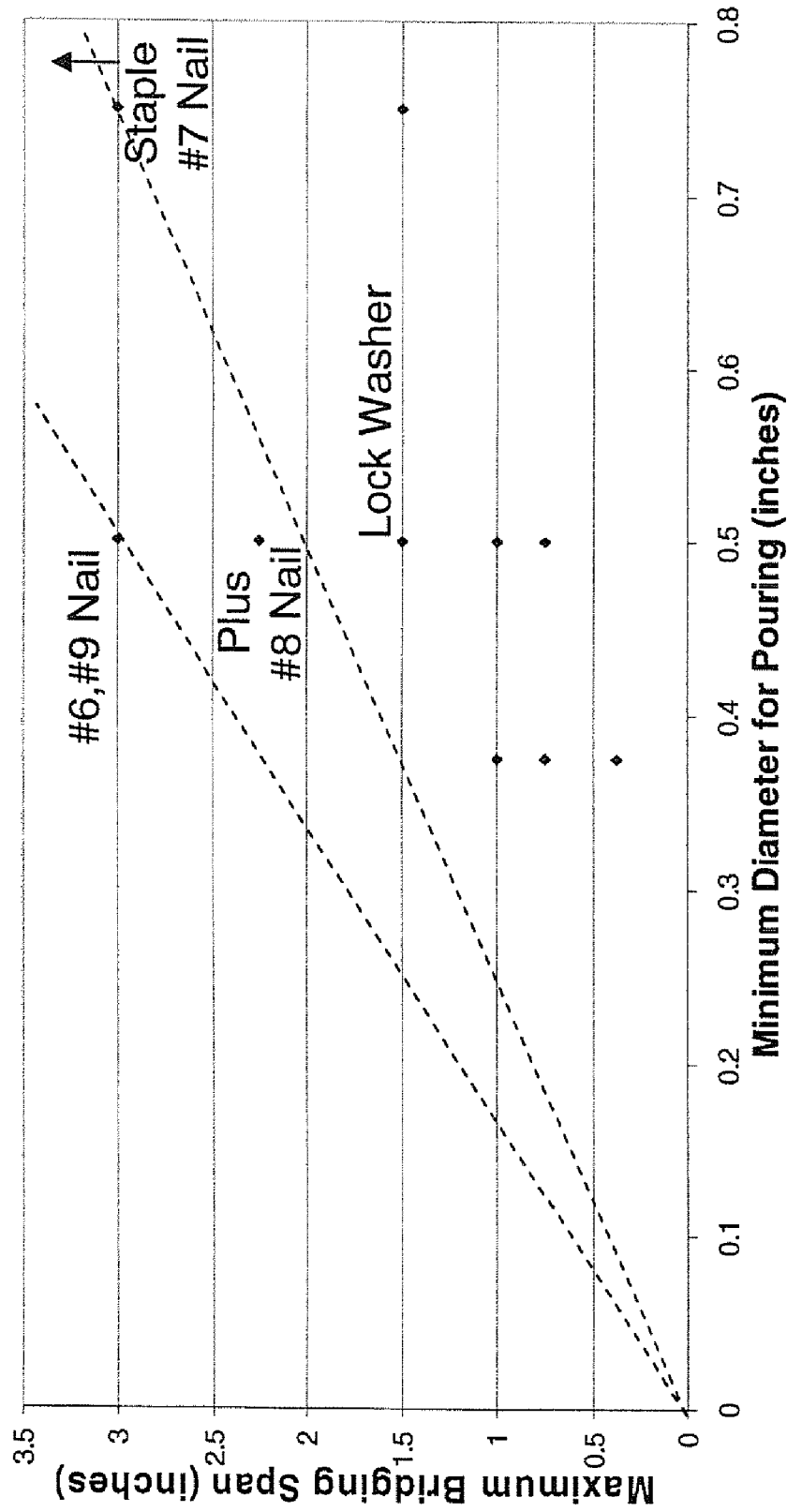
FIG. 8 illustrates a graph of the minimum diameter for pouring in inches versus the maximum bridging span in inches for proppants of the nail, plus, staple, and lock washer shape, illustrating how a balance is achieved between their ability to individually enter a small hole and collectively bridge a large gap.

FIG. 8 illustrates a graph of the minimum diameter for pouring in inches versus the maximum bridging span in inches for proppant of the nail, plus, staple, and lock washer shape. A balance is achieved between the proppant's ability to individually enter a small hole and collectively bridge a large gap. The top performing proppants are located towards the upper left-hand corner of this graph. Using a non-dimensional scaling analysis that will be discussed later, proppants along the dashed lines have equivalent performance. Thus, the top performing proppant shape is the nail shape. Other high performing shapes are proppants having a shape of a plus, lock washer, and staple. Note that the proppants having a staple shape and of this size are able to bridge a gap larger than 3 inches (about 7.6 centimeters) in diameter. The nail and the plus-shaped proppants also tested well. Thus, the nail, plus, lock washer, and staple proppant shapes are particularly advantageous for use in the invention.

Figure 9:
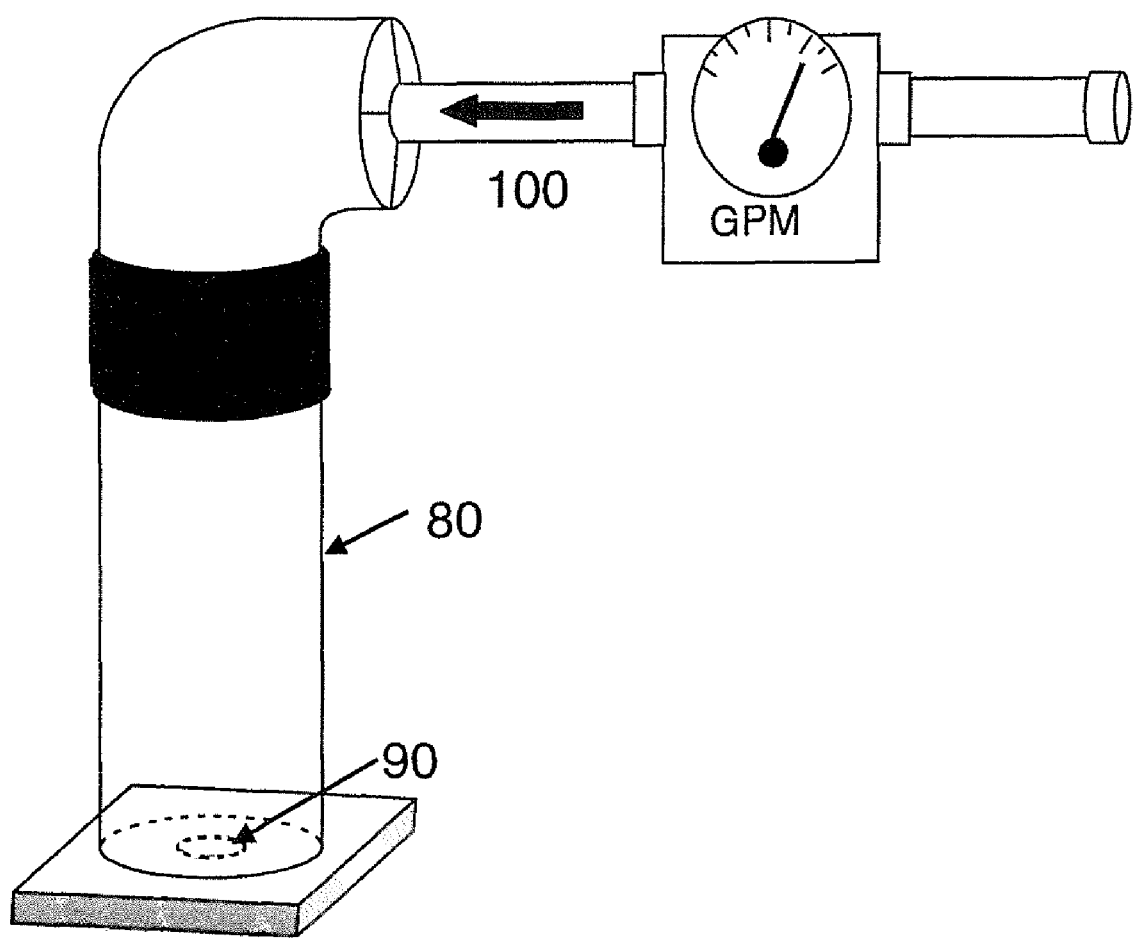
FIG. 9 illustrates a flow back testing apparatus that can be used to estimate fluid flow back of the particles.

Flow back tests can be conducted to determine how well the proppant bridges together. The flow back testing apparatus as illustrated in FIG. 9 can be used to estimate fluid flow back of proppant. The method to measure flow back performance is similar to that used to measure maximum bridging span: (1) the proppant is placed in a tube 80 with the outlet hole 90 blocked; (2) the proppant is compressed with roughly 10 psi to obtain a "link"; (3) the outlet hole is unblocked; and (4) water 100 is flowed through the proppant (not shown) that is within tube 80. The flow back tests measured the maximum flow rate before the proppant passes out of the tube 80. Proppants able to support a high flow rate across a wide exit diameter are most preferred.

Tests were also conducted where the proppants were mixed with 20/40 mesh sand in a variety of sand to proppant ratios. The minimum pouring diameter, maximum bridging span, and breakdown flow speed were measured. Without being limited by theory, it is believed that interstitial sand reduces the bridging capabilities of the proppant. For example, when the spoked-shaped proppant was mixed with the 20/40 sand, a minimum volume fraction was needed in order for the proppants to bridge together. Both the plus and lock washer-shaped proppants effectively bridged together once the weight of the proppant exceeded 40% of the sand weight or 12% by volume. The proppant of the plus shape prevent the production of 20/40 sand, even during high flow rates.

The proppant's breakdown flow speed was also measured. Breakdown flow speed measures the number of gallons per minute that can pass through an arch of proppant in a tube with a 1" diameter outlet without efflux of the proppant. Breakdown flow speed estimates the ability of the proppant shape to resist flow back of the proppant and other materials in a subterranean formation.

Figure 10:
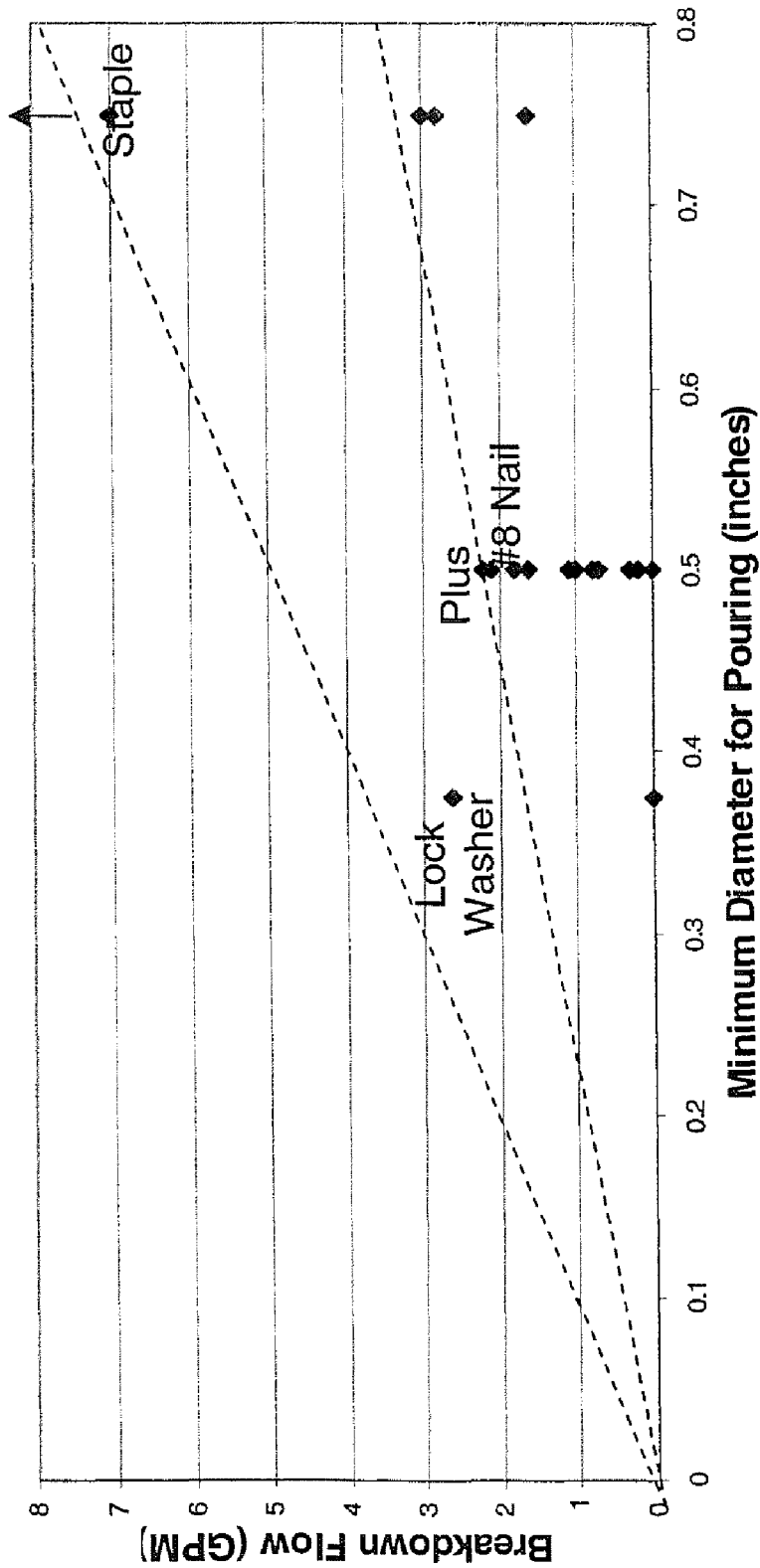
FIG. 10 illustrates a graph of the minimum diameter for pouring measured in inches versus the breakdown flow measured in gallons per minute, as measured with proppant of the lock washer, nail, plus, and staple shape.

A plot of the minimum pouring diameter measured in inches versus the breakdown flow speed measured in gallons per minute (GPM) is shown in FIG. 10 for the lock washer, nail, plus, and staple-shaped proppants. The proppant of the invention is able to hold large breakdown flow speed while also having a small minimum pouring diameter. The top performing proppants are located towards the upper left hand corner because they have a large break down flow speed while also having a small minimum pouring diameter. For example, the lock washer and the staple-shaped proppants were the top performing proppant shapes in this test.

Porosity measures the amount of empty space that is contained in a stack of proppants. Increased porosity in an open-cell structure generally correlates with greater permeability of hydrocarbon fluid through the proppant, or low flow resistance. The measurement of the proppant porosity according to the inventive proppant shapes demonstrated that the proppants have a much higher porosity than the 20/40 mesh sand. For example, the staple-shaped proppants have approximately 90% porosity. The nail, lock washer, and plus-shaped proppants were about 70% porous, and the 20/40 sand was only 30% porous. The staple-shaped proppants are advantageous because they have exceptionally high porosity, and thus have very little flow resistance. The high porosity of the proppants of the invention can further reduce their apparent cost because fewer proppants are needed to fill the hydraulic fracture.

The porosity of a proppant also influences the size of the sand that the proppant can hold during flow back. The size of the sand that is held during flow back is a function of the size of the proppant. The staple-shaped proppant and the nail-shaped proppant were able to hold sand that is larger than 20/40 mesh sand when the sand was mixed with the staple-shaped or nail-shaped proppants. Clearly, smaller proppant sizes for the stable-shaped and the nail-shaped proppants would be able to hold the 20/40 mesh sand. The plus and the lock washer-shaped proppants were able to hold the 20/40 sand. The lock washer-shaped proppants were also able to hold 100 micron-sized sand.

Porosity of the proppant is independent of the proppant size; rather, porosity depends on the proppant shape as long as the proppant is much smaller than the container. In hydraulic fracturing applications, the total proppant or proppant volume inside of a hydraulic fracture will remain the same, even as size of the proppant is scaled. As the size of each proppant proportionally increases, the total number of proppant particulates in the fracture decreases, and the total volume of proppant particulates in the fracture remain constant. As long as the shape and aspect ratio of the proppant are the same, the porosity will remain constant regardless of the proppant size.

Figure 11:
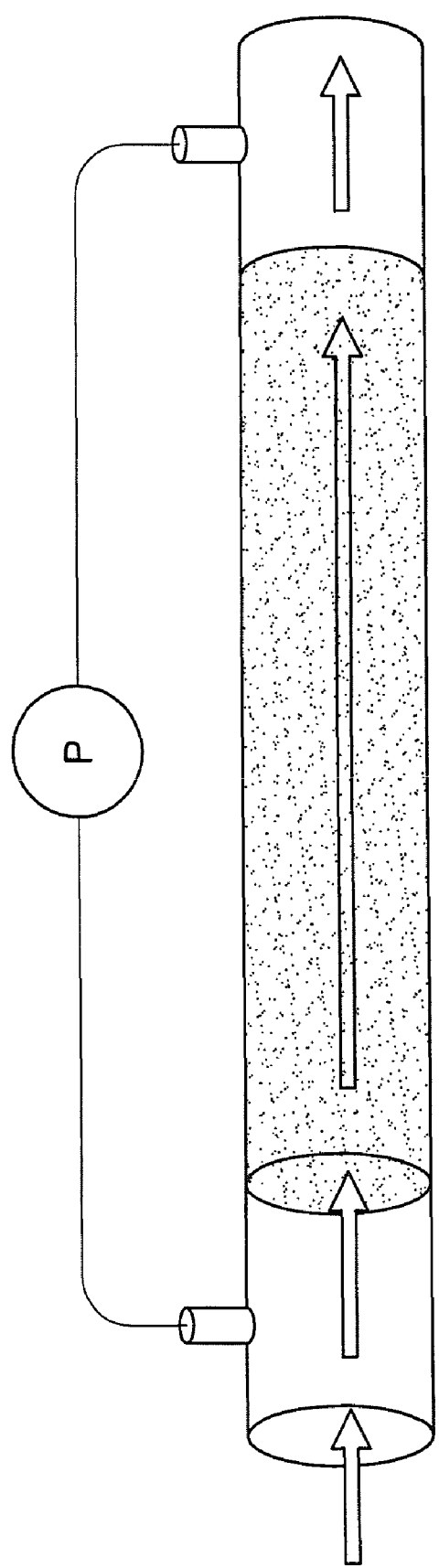
FIG. 11 illustrates a pressure drop apparatus for testing the pressure drop across the particles.

The final test was a measure of the proppant's permeability. The proppant's permeability was measured by noting the pressure drop through a proppant-filled tube apparatus as shown in FIG. 11. The pressure difference between the two ports reflects fluid flow resistance through the proppant. Fluid flow resistance is an estimate of the resistance that the proppant will exert against fluid flow during well production. The kinematic viscosity of water at room temperature is equivalent to 30 weight American Petroleum Institute (API) oil at typical downhole temperatures.

Figure 12:
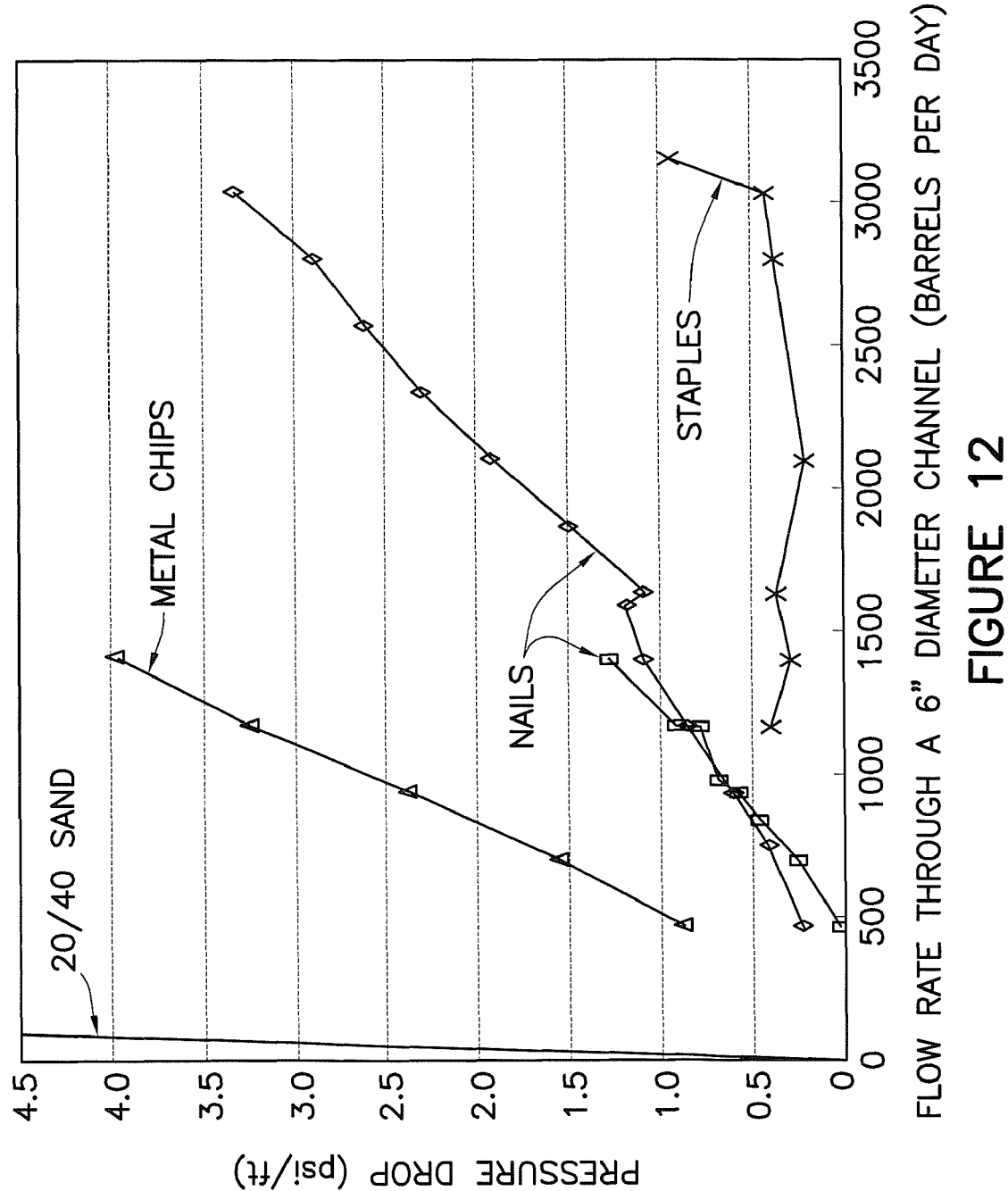
FIG. 12 illustrates a graph of the flow rate through a six inch diameter channel measured in barrels per day versus the pressure drop measured in pounds per square inch per foot (psi/ft)

The permeability test results are illustrated in the graph of FIG. 12, which plots the fluid flow rate through a six inch diameter channel (measured in barrels per day) versus the pressure drop (measured in pounds per square inch per foot, or psi/ft). As illustrated, the spoke-shaped proppant prevents flow through of 20/40 mesh sand. The proppant's permeability was measured at several thousand Darcy. Thus, the proppants provide substantially lower fluid flow resistance than sand. For example, the permeability of the nail-shaped proppant was calculated to be roughly 4000 Darcy. Although not shown, the permeability of the proppants that are of the plus and lock washer shape is equivalent to the permeability of the nail-shaped proppant. In application, for example, a 2500 bbl/day oil well that is producing 30 weight API oil through a 6 inch hole is estimated to have fluid resistance through nail-shaped proppant at roughly 2½ psi per foot. As the proppant size increases, the permeability of the proppant increases.

The properties and behavior of these proppants are tabulated in Table 1.

TABLE 1

Table of Top Performing Proppant Shapes

| | Nail | Lock washer | Plus | Staple |
|---|---|---|---|---|
| Mass (lbs) | 0.000183 | 0.000044 | 0.000073 | 0.000073 |
| Porosity | 70% | 70% | 70% | 90% |
| Minimum Pour Diameter (in) | 0.75 | 0.375 | 0.5 | 0.75 |
| Max Bridge Diameter(in) | 3 | 1 | 2.25 | 3 |
| Max Flow through 1" diameter (GPM) | 2.8 | 2.6 | 2.2 | 7+ |
| Max Flow back (GPM) | 1.2 @ 3" | 3 @ 1" | 2.1 @ 2.25" | 2.4 @ 3" |
| Bridging Mechanism | Combination | Compression | Compression | Tension |

Total deflection of a proppant pack provides is an estimate of the proppant's ability to prop open a fracture. The total deflection of a proppant pack is estimated based on axial compression, non-buckling bending, and buckling.

The performance of a proppant at various sizes can be extrapolated by non-dimensional scaling rules that are formulated to compare proppants of different sizes. The non-dimensional analysis assumes that the proppants stack and form columns perpendicular to a fracture when the proppant enters the fracture. Results of the non-dimensional sealing analysis are tabulated in Table 2. A non-dimensional scaling analysis is performed by proportionally scaling the proppant by a factor, n. The analysis is performed by looking at the order of n in the metric of interest. As indicated, the proppant behavior generally scales linearly with the size of the proppant, having a larger permeability. The scaling analysis indicates that larger proppants perform better than smaller proppants. However, premature bridging is the limiting factor that determines the proppant's size limit.

Figure 13B:
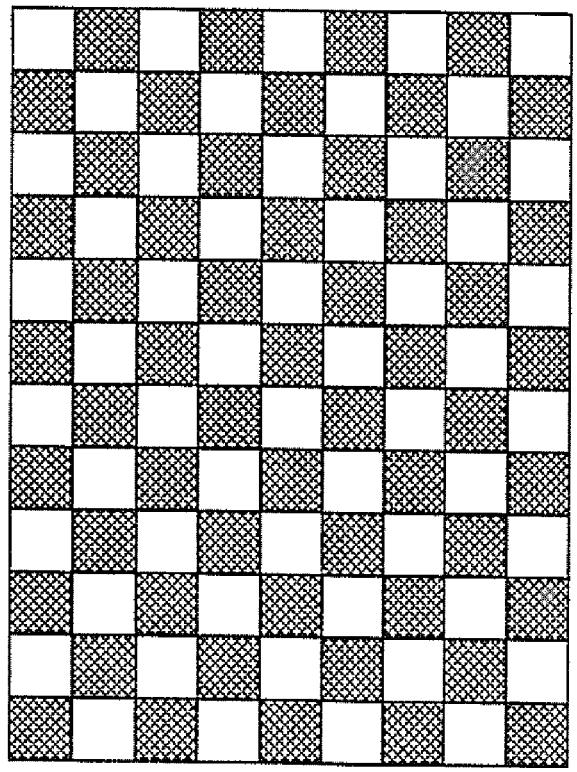
FIGS. 13A-13B are a schematic illustration of how the porosity of a proppant is independent of particle size, where the scaling behavior for n=1 is illustrated in FIG. 13A and where the scaling behavior for n=3 is illustrated in FIG. 13B.
Figure 13A:
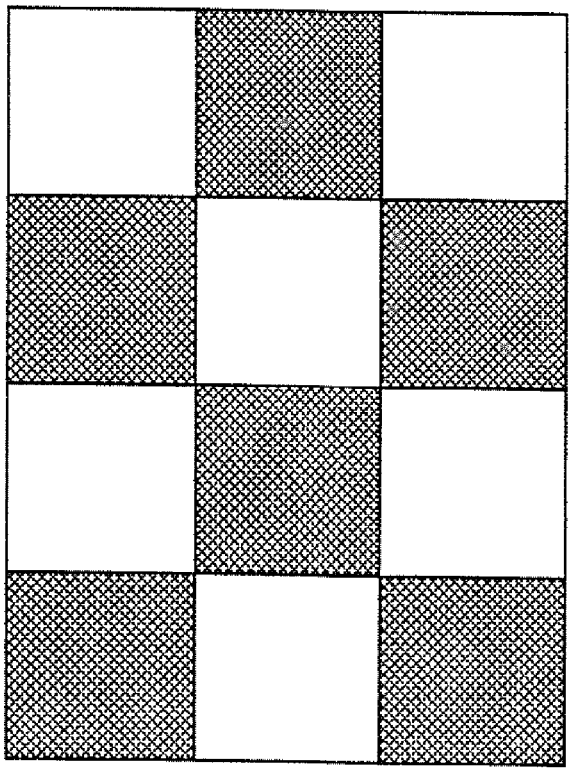

FIG. 13A and FIG. 13B illustrate a schematic demonstration that the porosity of a proppant is independent of proppant size as long as the proppant shape does not change, where the size n=1 is illustrated in FIG. 13A and the size n=3 is illustrated in FIG. 13B. Thus, when a fixed volume is filled, the total proppant volume will always remain the same if the individual proppant's dimensions are scaled proportionally, as long as the packing type of proppant does not change. In the same way, as the size of each proppant proportionally decreases, the total number of proppant particulates in the fracture proportionally increases. The result is that the total volume of proppant in the fracture remains the same, and the porosity remains constant.

TABLE 2

Effects of Changing Proppant Size

| | As Proppant size Decreases by n: |
|---|---|
| Maximum Bridging Span: | Decreases by n |
| Minimum Pouring Diameter: | Decreases by n |
| Porosity | Remains Constant |
| Permeability | Increases by n: Turbulent Flow |
| | Increases by $n^2$: Laminar Flow |
| Flow Resistance in the Channel: | Increases by n |
| Total Deflection of Proppant Pack: | Remains Constant |

The ability of the proppant to resist the compressive loads of the fracture can be characterized by examining their total deflection. It is not clear whether compression or bending will dominate the total deflection of a proppant pack. As a result, both of these deflections were analyzed. The deflections caused by compressive loads are invariant with proppant size. Modeling the proppants as columns, the deflection, δ, is given by:

$$\delta = B\frac{FL}{EA}$$

where F is the force on the column, L is the length of the proppant, E is the modulus of elasticity, A is the cross-sectional area of the column, and B is the number of proppant particulates in the column. As the proppant size decreases by a factor n, the cross-sectional area decreases by $n^2$ but the force per column decreases by a similar $n^2$. The length of the proppant decreases by n, but the number of proppant particulates in a column increases by a similar n. The factors of n cancel each other in the expression of the compressive load. The result is that the axial compression is constant with proppant size.

For a non-buckling bending load, the proppants can be modeled as beams in deflection. A beam with a load on it will experience a deflection, δ, given by $$\delta = -\frac{FL_b^3}{3EI}$$

where F is the load on the beam, E is the Modulus of Elasticity of the material, $L_b$ is the length of the beam, and I is the moment of inertia ($I = bh^3/12$).

Turning to FIG. 14A and FIG. 14B, illustrated is the scaling behavior for bending deflections, and the scaling behavior for n=1 is illustrated in FIG. 14A. The scaling behavior for n=2 is illustrated in FIG. 14B. As proppant size decreases by n times, the length of each beam, $L_b$, decreases by n, the inertia, I, decreases by $n^4$, and the load, F, decreases by $n^2$. The result is that the deflection of each beam decreases by n as the proppant size decreases by n. As the proppant size decreases, the number of proppant particulates in a column increases by n. As a result, the bending deflections of a column are constant. Table 3 lists how the parameters involved in beam deflection change as proppant size is changed.

TABLE 3

Factors Affected by Proppant Size for Beam Deflection

| | Nominal Value | Scaled Value |
|---|---|---|
| Length of each Beam | $L_b$ | $L_b/n$ |
| Moment of Inertia | I | $I/n^4$ |
| # of Beams in a Column | B | n * B |
| Load on a Column | F | $F/n^2$ |
| Deflection per Beam | δ | δ/n |
| Total Deflection | δ * B | δ * B |

Total Deflection ∝ (Deflection per Beam) * (# of beams in column)
Nominal: Total Deflection ∝ (δ) * (B)
Scaled Value: Total Deflection ∝ (δ/n) * (B * n) = (δ) * (B)

The deflection from compressive loads and from bending loads does not change with change in proppant size. As a result, the ability of the proppant pack to resist the compressive loads of the fracture does not change with change of proppant size.

The permeability of the proppant pack is characterized based upon the flow friction of the fluid. The head loss due to friction in a channel flow, $h_f$, is modeled as $$h_f = f \frac{LV^2}{2dg}, V = \frac{Q}{A}$$

where d is the channel width, f is the friction coefficient, L is the length of the flow path, and g is gravity. The length of the flow path and gravity remain constant as the proppant size changes. The velocity, V, equals the flow rate, Q, over the area, A. Since flow rate and flow area are both constant, the velocity of the fluid traveling through the channel also will be constant. The channel width, d, varies linearly with the proppant size. If the flow is highly turbulent, then the friction coefficient is constant and the head loss, $h_f$, is proportional to n. However, if the flow is laminar, then the friction coefficient scales inversely with the proppant size (f=64 v/(V*D)) and the head loss is proportional to $n^2$.

Table 4 summarizes the changes in proppant properties as a function of the proppant dimensions.

TABLE 4

Effects of Changing Proppant Size

| | As Proppant Size Increases by n: | As Proppant Size Decreases by n: |
|---|---|---|
| Flow Area | Constant | Constant |
| Axial Compression Stiffness | Constant | Constant |
| Bending Stiffness | Constant | Constant |
| Permeability - Turbulent | Increases by n | Decreases by n |
| Permeability - Laminar | Increases by $n^2$ | Decreases by $n^2$ |
| Minimum Diameter for Pouring | Increases by n | Decreases by n |
| Maximum Bridging Span | Increases by n | Decreases by n |

If the proppant size is decreased by n, then the flow resistance is increased by n for turbulent flow and is increased by $n^2$ for laminar flow. In other words, the permeability scales linearly with the proppant size if the flow is turbulent and the permeability scales quadratically with the proppant size if the flow is laminar.

The proppants of the invention can be applied to hydraulic fracturing, gravel packing, open-hole completions, cementing, ect. This invention is especially useful in hydraulic fracturing once the flow is reversed because the proppant bridges together, and thus, is less likely to flow out of the well. Another application for proppants is for use as an alternative to a sand screen in an open hole. The proppant can be inserted into the open hole and can hold open the formation. The proppants can also be used in gravel packing to bridge around the sand filter before the gravel is packed in, or the proppants can aid in cementing applications by increasing the amount of shear that the cement can handle. When added to a gravel pack or to a cement slurry, the proppant can change the ductility, the shear angles, or the compressive strength. In one embodiment, the invention provides a method for filling an annular area within a wellbore penetrated by a subterranean formation comprising the steps of: a) introducing a proppant into a wellbore, wherein a typical specimen of the proppant has a non-globular and non-fibrous shape; and b) passing fluid through the gravel pack.

After careful consideration of the specific and exemplary embodiments of the present invention described herein, a person of ordinary skill in the art will appreciate that certain modifications, substitutions, and other changes can be made without substantially deviating from the principles of the present invention. The detailed description is illustrative, the scope and spirit of the invention being limited only by the appended Claims.

What is claimed is:

1. A method for filling an annular area within a wellbore penetrated by a subterranean formation comprising the steps of:
   a. introducing a proppant into a wellbore to form a gravel pack of the proppant, wherein a specimen of the proppant has a non-globular and non-fibrous shape, and wherein the shape is further selected to provide the proppant the ability to bridge together such that the proppant has a maximum bridging span of at least 3 times larger than a largest overall dimension of the proppant specimen, where the maximum bridging span is the largest outlet hole diameter that the proppant can bridge under the weight of gravity; and
   b. passing fluid through the gravel pack.

2. The method according to claim 1, wherein the proppant specimen has a shape at least partially defined by an aspect ratio of the lengths of a first and second largest imaginary cylinders, based on whichever is longer, being less than 50:1, where:
   the first largest imaginary cylinder is the largest imaginary cylinder that: (a) can be imaginarily positioned in any portion of the solid body of the proppant specimen, and (b) is at least as large in volume as any other imaginary cylinder that can be imaginarily positioned in any other portion of the solid body of the proppant specimen; and
   the second largest imaginary cylinder is the second largest imaginary cylinder that: (a) can be imaginarily positioned in any portion of the solid body of the proppant specimen, (b) is less than or equal in volume to the first largest imaginary cylinder, and (c) has an axis substantially non-aligned and substantially non-symmetrical relative to the axis of first largest imaginary cylinder.

3. The method according to claim 2, wherein the proppant specimen has a shape at least partially defined by an aspect ratio of the lengths of the second and third largest imaginary cylinders, based on whichever is longer, being less than 50:1, where:

the third largest imaginary cylinder is the third largest imaginary cylinder that: (a) can be imaginarily positioned in any portion of the solid body of the proppant specimen, (b) is less than or equal in volume to the second largest imaginary cylinder, and (c) has an axis substantially non-aligned and substantially non-symmetrical relative to the axis of the first largest imaginary cylinder and substantially non-aligned and substantially non-symmetrical to the axis of the second largest imaginary cylinder.

4. The method according to claim 1, wherein the proppant specimen has a shape at least partially defined by an aspect ratio of the lengths of a first and second largest imaginary cylinders, based on whichever is longer, being less than 5:1, where:

the first largest imaginary cylinder is the largest imaginary cylinder that: (a) can be imaginarily positioned in any portion of the solid body of the proppant specimen, and (b) is at least as large in volume as any other imaginary cylinder that can be imaginarily positioned in any other portion of the solid body of the proppant specimen; and the second largest imaginary cylinder is the second largest imaginary cylinder that: (a) can be imaginarily positioned in any portion of the solid body of the proppant specimen, (b) is less than or equal in volume to the first largest imaginary cylinder, and (c) has an axis substantially non-aligned and substantially non-symmetrical relative to the axis of first largest imaginary cylinder.

5. The method according to claim 4, wherein the proppant specimen has a shape at least partially defined by an aspect ratio of the lengths of the second and third largest imaginary cylinders, based on whichever is longer, being less than 5:1, where:

the third largest imaginary cylinder is the third largest imaginary cylinder that: (a) can be imaginarily positioned in any portion of the solid body of the proppant specimen, (b) is less than or equal in volume to the second largest imaginary cylinder, and (c) has an axis substantially non-aligned and substantially non-symmetrical relative to the axis of the first largest imaginary cylinder and substantially non-aligned and substantially non-symmetrical to the axis of the second largest imaginary cylinder.

6. The method according to claim 1, wherein the proppant has a permeability of at least 100 Darcy and a porosity of at least 40%.

7. The method according to claim 1, wherein the proppant specimen is substantially rigid.

8. The method according to claim 7, wherein the proppant compressed up to about eighty percent of its compressive strength, has a permeability of at least 100 Darcy and a porosity of at least 40%.

9. The method according to claim 1, wherein the proppant specimen has an overall dimension of less than ½ inch and greater than ¹⁄₁₆ inch.

10. The method according to claim 1, wherein the proppant is capable of bridging together to form a tension or compression bridge.

11. The method according to claim 1, wherein the shape of the proppant specimen is selected from the group consisting of a rotationally symmetrical shape, a radially symmetrical shape, a reflectively symmetrical shape, and a jointed shape.

12. The method according to claim 11, wherein the shape of the proppant specimen is selected from the group consisting of a nail, badminton, lock washer, plus, jack, and staple.

13. The method according to claim 1, wherein the shape of a typical specimen of the proppant is selected from the group consisting of lobed shapes, figure eight shapes, star shapes, rectangular cross-sectional shapes, six point jack shapes, and torroid shapes.

14. The method according to claim 1, wherein the shape of the proppant specimen is selected from the group consisting of akmon, cube (modified), tetrapod, accropod, gasho block, n-shaped block, toskane, dolos, and tribar.

* * * * *